United States Patent
Szonyi et al.

(10) Patent No.: US 6,180,826 B1
(45) Date of Patent: Jan. 30, 2001

(54) OIL AND ALCOHOL REPELLENT FLUORINATED SURFACTANTS AND INTERMEDIATES, DERIVATIVES AND USES THEREOF

(75) Inventors: Istvan Szonyi, Monte-Carlo; Stephane Szonyi, Nice; Francois Szonyi, Monte-Carlo, all of (FR)

(73) Assignee: Laboratoire 3 S, Pte de Monaco ( * ) Notice: Under 35 U.S.C. 154(b), the term of this patent shall be extended for 0 days.

(21) Appl. No.: 09/015,936

(22) Filed: Jan. 30, 1998

Related U.S. Application Data

(63) Continuation of application No. 08/318,775, filed on Oct. 11, 1994, now abandoned.

(30) Foreign Application Priority Data

Feb. 11, 1993 (FR) .................................................. 93 01749
Feb. 3, 1994 (WO) ................................... PCT/FR94/00129

(51) Int. Cl.⁷ .................................................. C07C 315/00
(52) U.S. Cl. .............................. 562/556; 252/3; 560/150; 560/169; 560/171; 562/565; 562/571; 562/574
(58) Field of Search .................................... 562/556, 565, 562/571, 574; 560/150, 169, 171

(56) References Cited

U.S. PATENT DOCUMENTS

| | | | | |
|---|---|---|---|---|
| 4,015,612 | * | 4/1977 | Pavlik | 132/7 |
| 4,089,804 | | 5/1978 | Falk | 252/355 |
| 4,160,777 | | 7/1979 | Loudas | 562/574 |
| 4,303,524 | | 12/1981 | Hisamoto | 252/3 |
| 5,725,789 | * | 3/1998 | Huber | 252/8.26 |

FOREIGN PATENT DOCUMENTS

| | | |
|---|---|---|
| 0 390 905 | 10/1990 | (EP) . |
| 2 637 506 | 10/1988 | (FR) . |
| 90 03966 | 4/1990 | (WO) . |

* cited by examiner

*Primary Examiner*—Michael L. Shippen
(74) *Attorney, Agent, or Firm*—Pillsbury Madison & Sutro LLP

(57) ABSTRACT

New water-soluble polyperfluoroalkyl surfactants derived from functional polycarboxylic polymers, characterized by the fact they have alco-oleophobic properties, to be used in the make-up of protein or synthetic foam for extinguishing fires caused not only by hydrocarbons, but also by polar liquids (alcohol, ethers, esters, etc.) without requiring the use of thickening agents, such as polysaccharides.

4 Claims, No Drawings

OIL AND ALCOHOL REPELLENT FLUORINATED SURFACTANTS AND INTERMEDIATES, DERIVATIVES AND USES THEREOF

This is a continuation of Application Ser. No. 08/318,775, filed Oct. 11, 1994 now abandoned.

This invention concerns new polyperfluoroalkyl surfactants, water-soluble derivatives of functional polycarboxylic polymers containing no organic quaternary nitrogen atoms, with properties that are not only oleophobic, but strongly alcophobic, usable alone or with emulsifiers having a synthetic or protein foaming base to fight fires caused by polar liquids or hydrocarbons.

For several decades perfluoroalkyl surfactants,have been used in the manufacture of fire-extinguishing foams. These fluorinated products make the foam oleophobic, thereby protecting it against hydrocarbon contamination and reinforcing its efficacy in extinguishing fires caused by hydrocarbons.

All these foams, however, are ineffective against fires caused by polar liquids; they are destroyed on contact with dehydrating liquids, such as alcohol, ketones, etc. These surfactants are not alcophobic.

For fighting fires caused by polar liquids, it has been suggested (DP-6976461940) that complex salts, such as ammoniac zinc caprylate for instance, be incorporated into the hydrolysed protein solution. These foams are somewhat resistant to alcohol fires, but much less so against hydrocarbon fires because of the presence of fatty soaps. This defect can be offset by adding oleophobic fluorinated surfactants available on the market. There still remains, however, a major problem: when these emulsifiers are diluted in water for use, they are hydrolysed within minutes and lose their foaming and extinguishing properties.

To preserve the emulsifier's qualities during premixing, it has been suggested that the complex ammoniac salt be replaced in the concentrate with polysaccharide-type polymers; and that an oleophobic fluorinated surfactant (U.S. Pat. No. 4,060,489; FR 8003640) be incorporated to reinforce the foam's resistance to hydrocarbon fires. These liquid emulsifiers are widespread on the market. They are prepared with a synthetic or protein foaming base and are called pseudoplastic emulsifiers for their rheological behaviour. In general, they are remarkably effective for extinguishing polar liquid and hydrocarbon fires; but their viscosity makes these concentrates hard to use especially at low temperatures.

The authors' Patent FR 88-13612 suggests improving the fluidity of pseudoplastic emulsifiers by reducing the concentrate's polysaccharide content and by adding a reactive quaternary perfluoroalkyl polyamine (patent FR 88-11345, by the authors) in order to convert the polysaccharide into a fluorinated substance resistant to polar liquid and hydrocarbon fires.

Other polymers have also been suggested for resistance to alcohol fires: methylic vinyl ether or maleic anhydride copolymer salts, for instance. The problem with the latter is in the fact that a very large amount of the foaming solution is needed, which makes it hard to use and still produces a poor result.

U.S. Pat. 2378629 and Australian patent no. 40709-72 suggest using an alkylamide derivative of the above-mentioned copolymer to replace the protein hydrolysed in the extinguishing foam. These foams are ineffective against polar liquid fires and mediocre against hydrocarbon fires.

Several patents suggest using monoperfluoroalkyl polyacrylamides in the omega position to stabilise protein foams against hydrocarbon fires, but such foams are ineffective against polar liquid fires.

On the market, there are three types of these perfluoroalkyl polyacrylamide compounds:

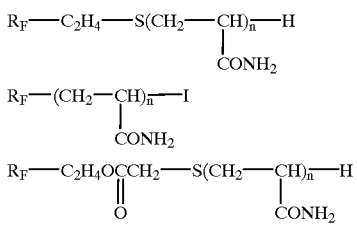

Patent JP 04 126 709 describes ether alkenyl and perfluoroalkyl maleic anhydride copolymers in which the fluorinated group is placed in the carbon chain but not bonded to the carboxyl group. This product is intended for waterproofing, so it is not for use in the preparation of aqueous foams.

Patent JP 03 243 609 causes polyacrylic acid to react with dihydroperfluorooctylamine to yield a hydrofuge product. The amide nitrogen atom obtained does not have the hydrophilic group necessary to promote alcophobia and water-solubility.

Fluorinated surfactants that are both alcophobic and oleophobic are described in patents FR 88/12152, FR 88/11345 and FR 88/113612 by the authors. Their quality is significant, but the fact these molecules necessarily contain a quaternary nitrogen atom limits their compatibility With anionic surfactant agents and protein derivatives.

To offset all the problems mentioned above, we sought according to the invention to synthesise new fluorinated surfactants that were both alcophobic and oleophobic and compatible with anionic surfactant agents and protein derivatives. Thus the novelty of the products according to the invention, in comparison with known surfactants, lies in the fact they are alco-oleophobic, compatible with anionic surfactant. agents and protein derivatives, that these macro-molecules contain several perfluoroalkyl groups and have no organic quaternary nitrogen atom; the radicals carrying a perfluoroalkyl group are bonded to the carboxylic functions belonging to the polymer through an ester or amide bond; the nitrogen atom carries a hydrophilic group to promote alcophobia. The following examples illustrate the invention and are in no case limitative:

EXAMPLE 1

Preparation of a polymer made up of the following structural units:

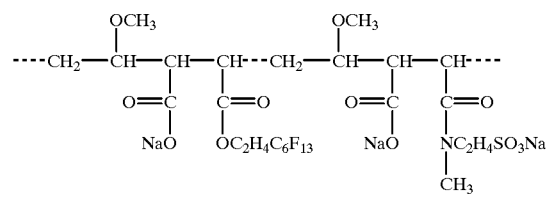

In a spherical glass container equipped with a coolant and a stirrer, dissolve 15.6 g (0.1 mole per polymer unit) of methyl vinyl ether and maleic anhydride copolymer (molecular weight≈25000) in 35 g of dimethylformamide at 30° C. Add 12 g (0.04 mole) of perfluorohexyl ethanol and heat to 70° C., mixing overnight (10 to 15 hours).

Let cool to 30° C. and add 36 g of technical sodium N-methyl-taurinate, approx. 62–65% (≈0.14 mole). The reaction is exothermic: the mixture heats to 60° C. and thickens. Mix for approx. one half-hour and pour in 97 ml of water.

This yields 195 g of a viscous solution, with pH 8, perfectly water-soluble and containing approx. 25% of active material.

| | |
|---|---|
| Surface tension at 0.1%: | 20 dynes/cm |
| Surface tension at 0.01%: | 40 dynes/cm |
| Interfacial tension at 0.1%: | 6 dynes/cm |
| Alcophobic value: | 10 seconds |

EXAMPLE 2

Preparation of a polymer made up of the following structural units:

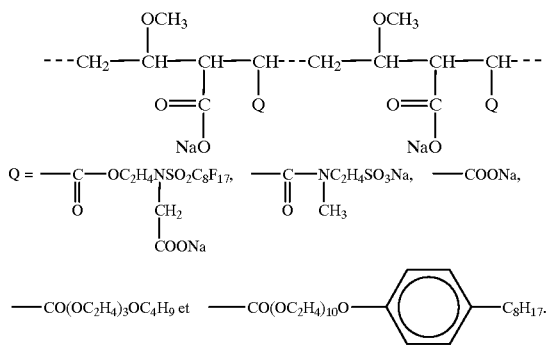

In a reactor equipped with a coolant, a stirrer and a dropping funnel, weigh 3.70 g (0.060 mole) of monoethanolamine and 6.60 g (0.067 mole) of triethylamine, both dissolved in 25 g of dimethylformamide. Then, at a temperature not exceeding 40° C., add 30 g (0.060 mole) of perfluorooctyl sulfonyl fluoride drop by drop. After it has been added, stir the mixture for 1 hour at 40° C. and for 2 hours at 80° C. Then add 7 g (0.060 mole) of sodium monochloroacetate and mix at 70–75° C. for 5 hours.

This yields 72 g of solution containing approx. 50% of active material, with the following formula:

| | |
|---|---|
| Surface tension at 0.1%: | 19.3 dynes/cm |
| Surface tension at 0.02%: | 25.4 dynes/cm |
| Interfacial tension at 0.1%: | 5 dynes/cm |

Cooling the solution yields abundant triethylamine chloride and fluoride salt crystals. The residue is filtered and rinsed with 15 g of DMF. This yields 72 g of solution containing approx. 50% of active material.

Weigh 33.6 g of the previously obtained solution (containing 0.028 mole of perfluorooctyl sulfonyl fluoride) and dilute with 30 g of dimethylformamide, then use to dissolve 22 g (0.141 mole) of methyl vinyl ether and maleic anhydride copolymer. Stir the mixture and heat to 40° C.; the exothermic effect raises the temperature of the solution to 115° C. Then mix for 4 hours at 100–110° C. Then pour 9 g (0.043 mole) of butyltriglycol, 10 g (0.015 mole) of decaethyleneglycol octylphenyl ether (OP 10) and 0.40 g of concentrated $H_2SO_4$ into the mixture. Heat the mixture for another 5 hours at 105–110° C. (the first hour of the reaction is strong exothermic). Let the mixture cool to 20–25° C. and add 44 g (0.174 mole) of technical sodium N-methyl taurinate (approx. 62–65%). The exothermic reaction then raises the temperature of the mixture to 60° C. The solution is mixed for a further 30 minutes; then pour 51 g of water and heat the mixture for 30 minutes at 50° C. The solution obtained weighs 200 g and contains approx. 40% of active material. It has a pH of 8.5 and a density of 1.17.

| | |
|---|---|
| Surface tension at 0.1%: | 17.6 dynes/cm |
| Surface tension at 0.01%: | 41.1 dynes/cm |
| Interfacial tension at 0.1%: | 6 dynes/cm |
| Alcophobic value: | 15 seconds |

EXAMPLE 3

Preparation of a polymer made up of the following structural units:

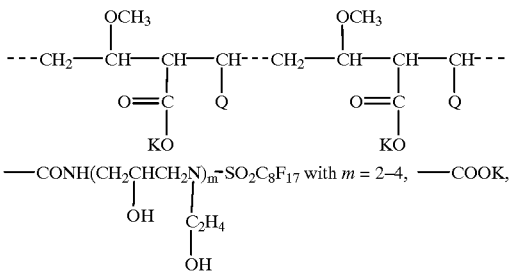

and —$CONH_2$.

Intermediate (a):

In a reactor equipped with a mixer with propeller and a cooling reflux, weigh 50 g (0.32 mole) of methyl vinyl ether and maleic anhydride copolymer and pour 100 ml of water, then 100 g of 20% ammonia (1.17 mole). Stir the mixture and cool for 2 hours, then leave overnight without agitation. The next day, the solution has the appearance of a homogeneous viscous liquid, without formation of lumps. Its total weight is 250 g, and it contains 20% of the polymer, calculated from the anhydride.

Intermediate (b):

In a reactor, insert 18.3 g (0.30 mole) of monoethanolamine dissolved in 20 g of dimethylformamide and pour in 50 g (0.10 mole) of perfluorooctyl sulfonyl fluoride drop by drop, while mixing and cooling. This operation takes approx. 1 hour, with the temperature maintained between 20 and 30° C.; continue mixing for another 3 hours at 30–40° C. and add 84 ml of water. Then slowly pour in 27.8 g (0.30 mole) of epichlorohydrin, while mixing and cooling. This operation takes approx. one half hour, maintaining the mixture at 35–40° C. The mixture should be mixed for another 3 hours at 35–40° C.

Prepare a concentrated KOH solution (30 g of technical KOH and 30 g of $H_2O$ corresponding to approx. 0.46 mole of KOH) and, after having cooled the mixture to 30 or 40° C., incorporate into the mixture described above. Continue mixing for approx. 10 hours at 70° C., to obtain approx. 260 g of liquid product, that tends to separate into two phases.

Reaction Between the Two Intermediates (a) and (b):

In the reactor containing the 260 g of product (b), pour in, while mixing, 250 g of product (a) containing 0.32 mole of polymer. Continue mixing for approx. 15 hours at 90° C. Then add 600 ml of water and 90 g of butyldiglycol. The resulting solution weighs 1200 g, contains approx. 10% of active material and is perfectly water-soluble, with pH 9.

| Surface tension at 0.1%: | 18 dynes/cm |
|---|---|
| Surface tension at 0.01%: | 30 dynes/cm |
| Interfacial tension at 0.1%: | 5 dynes/cm |
| Alcophobic value: | 30 seconds |

EXAMPLE 4

Preparation of a polymer made up of the following structural units:

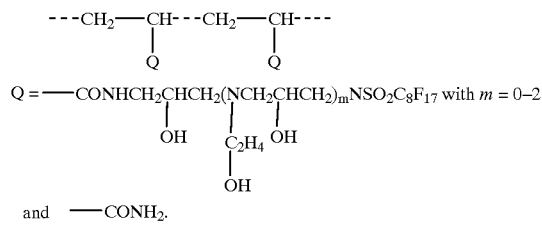

and —CONH$_2$.

In a reactor, insert 130 g of the solution obtained as in example 3 (intermediate b) containing 0.05 mole of perfluorooctyl rest and add 125 g of aqueous 20% polyacrylamide solution. Then mix for 18 hours at 90° C.

Then add 300 ml of water and 45 g of butyidiglycol. The resulting solution weighs 600 g, contains approx. 10% of active material, with pH 8.

| Surface tension at 0.1%: | 19 dynes/cm |
|---|---|
| Surface tension at 0.01%: | 40 dynes/cm |
| Interfacial tension at 0.1%: | 6 dynes/cm |
| Alcophobic value: | 20 seconds |

EXAMPLE 5

Preparation of a polymer made up of the following structural units:

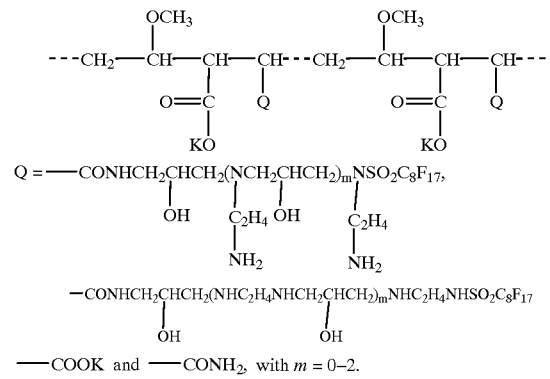

—COOK and —CONH$_2$, with $m$ = 0–2.

Intermediate (a):

In a reactor equipped with a mixer and a coolant, insert 18 g (0.30 mole) of ethylenediamine and 20 g of dimethylformamide. Add 50 g (0.10 mole) of perfluorooctyl sulfonyl fluoride drop by drop, while mixing and cooling. This operation takes approx. 1 hour, with the temperature of the mixture maintained between 20 and 30° C.; continue mixing for another 3 hours at 30–40° C. then add 84.2 ml of water.

Then slowly pour in, while mixing and cooling, 27.8 g (0.30 mole) of epichlorohydrin. This operation takes approx. 30 minutes with the temperature of the mixture maintained at 35–40° C. Stir the mixture for another 3 hours at 35–40° C.

Pour 60 g of concentrated caustic potash (30 g of technical KOH in 30 ml of water) and raise the temperature to 80–90° C. Stir the mixture for approx. 10 hours at 90° C. to obtain 260 g of mixture.

Finishing:

Pour into the previous mixture 250 g of a polyamide solution prepared as in example 3 (intermediate a), containing 0.32 mole per polymer unit and continue mixing for 15 hours at 90° C. Let cool and pour in 90 g of butyidiglycol and 600 ml of water. This yields 1200 g of product containing approx. 10% of active material, with pH 8.5 and perfectly water-soluble.

| Surface tension at 0.1%: | 19 dynes/cm |
|---|---|
| Surface tension at 0.01%: | 35 dynes/cm |
| Interfacial tension at 0.1%: | 5.5 dynes/cm |
| Alcophobic value: | 32 seconds |

EXAMPLE 6

Preparation of a polymer made up of the following structural units:

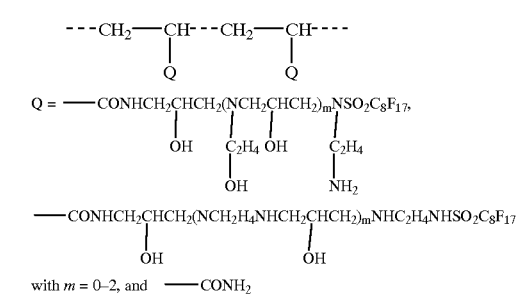

with $m$ = 0–2, and —CONH$_2$

Insert into a reactor 250 g (0.70 mole per polymer unit) of a 20% polyacrylamide solution and pour in 260 g of intermediate product (a) obtained in example 5. Mix for 15 hours at 90° C. Then let cool and pour in 600 ml of water and 90 g of butyidiglycol. This mixture weight 1200 g, contains approx. 10% of active material and is perfectly water-soluble, with pH 8.

| Surface tension at 0.1%: | 20 dynes/cm |
|---|---|
| Surface tension at 0.01%: | 38 dynes/cm |
| Interfacial tension at 0.1%: | 5 dynes/cm |
| Alcophobic value: | 25 seconds |

EXAMPLE 7

Preparation of a polymer made up of the following structural units:

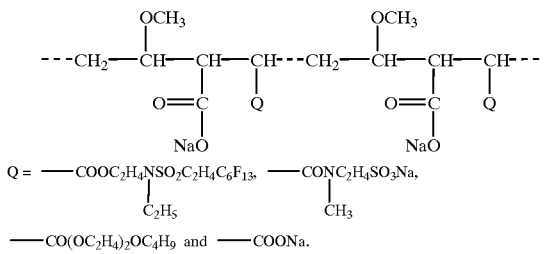

$Q =$ —COOC$_2$H$_4$NSO$_2$C$_2$H$_4$C$_6$F$_{13}$, —CONC$_2$H$_4$SO$_3$Na,
          |                                    |
          C$_2$H$_5$                           CH$_3$

—CO(OC$_2$H$_4$)$_2$OC$_4$H$_9$ and —COONa.

Insert into a spherical glass container equipped with a mixer and a coolant 2 g of dimethylformamide, 2.47 g (0.028 mole) of N-ethyl-ethanolamine and 3.13 g (0.031 mole) of triethylamine. Then add 12.45 g (0.028 mole) of perfluorohexyl-ethane sulfonyl chloride dissolved in 10 g of dimethyl formamide, drop by drop while mixing at a temperature maintained under 40° C. After this operation, mix for another hour at 40° C. and for 2 hours at 80° C.

Then pour in 52 g of the viscous solution containing 22 g (0.141 mole) of methyl vinyl ether and maleic anhydride copolymer and 30 g of dimethyl formamide. Add 9 g (0.056 mole) of butyldiglycol and 0.40 g of concentrated sulphuric acid. Mix for 10 hours at 105° C. Let cool and add 44 g (0.174 mole) of sodium N-methyl taurinate (62–65%), mix at 60° C. for 30 minutes and dilute the mixture with 64.55 ml of water to obtain 200 g of concentrated solution containing approx. 30% of active material, with pH 8.

| Surface tension at 0.1%: | 18 dynes/cm |
| Surface tension at 0.01%: | 37 dynes/cm |
| Interfacial tension at 0.1%: | 6 dynes/cm |
| Alcophobic value: | 12 seconds |

EXAMPLE 8

Preparation of a polymer made up of the following structural units:

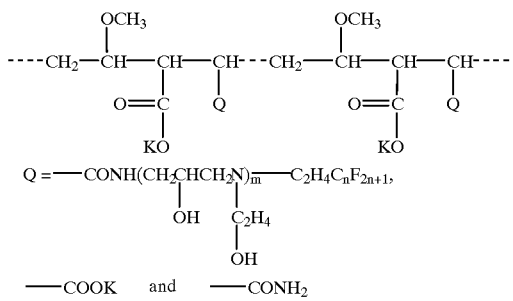

—COOK  and  —CONH$_2$ with m=5–20 and n=6–16

In a reactor with a coolant and a stirrer, cause to react 28.6 g (0.05 mole) of a perfluoroalkyl ethyl iodide mixture, previously heated to 30° C., with the formula C$_n$F$_{2n+1}$C$_2$H$_4$I and containing approx.:

| 54% in weight | C$_6$F$_{13}$—C$_2$H$_4$I |
| 27% | C$_8$F$_{17}$—C$_2$H$_4$I |
| 11% | C$_{10}$F$_{21}$—C$_2$H$_4$I |
| 4.5% | C$_{12}$F$_{25}$—C$_2$H$_4$I |
| 2% | C$_{14}$F$_{29}$—C$_2$H$_4$I |
| 1% | C$_{16}$F$_{33}$—C$_2$H$_4$I | with 30.50 g (0.50 mole) of monoethanolamine, dissolved in 20 g of dimethylformamide. The temperature is maintained at 90° C. while stirring for 4 hours.

Then let cool to 60–70° C. and add 46.25 g (0.50mole) of epichlorohydrin in several portions. After this operation, mix at 70° C. for 1 hour and at 80° C. for 10 hours. Cool to 60° C. and add 37 g (0.60 mole) of technical caustic potash dissolved in 40 ml of water. Continue mixing at 90° C. for approx. 10 hours.

Then add 125 g of polyamide obtained as in example 3 (intermediate a), containing 0.160 moles per polymer unit, and mix at 90° C. for 15 hours. Add 60 g of butyldiglycol and dilute with 212.65 ml of water to obtain 600 g of solution containing approx. 17% of active material, with pH 8.5.

| Surface tension at 0.1%: | 22 dynes/cm |
| Surface tension at 0.01%: | 40 dynes/cm |
| Interfacial tension at 0.1%: | 7 dynes/cm |
| Alcophobic value: | 37 seconds |

EXAMPLE 9

Preparation of a polymer made up of the following structural units:

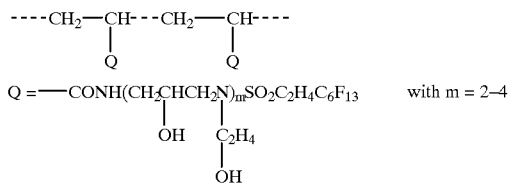

and —CONH$_2$.

In a reactor with a stirrer and a coolant, weigh 18.30 g (0.30 mole) of monoethanolamine and add 44.4 g (0.10 mole) of perfluorohexyl-ethane sulfonyl chloride dissolved in 20 g of dimethyl formamide drop by drop at 40° C. After this operation mix for 1 hour more at 40° C. and 2 hours at 80° C. Then pour in 89.5 ml of water and 27.8 g (0.30 mole) of glycerol epichlorohydrin in several portion maintaining the temperature at 40–50° C. After this operation, mix for 1 hour at 70° C. and for another 10 hours at 80–90° C.

Prepare a concentrated caustic potash solution, containing 30 g (0.46 mole) of technical caustic potash and 30 ml of water. Pour this solution into the previous mixture and continue mixing for 10 hours at 90° C. Then add 250 g (0.70 mole per polymer unit) of polyacrylamide (20% solution in water) and mix for 15 hours at 80° C. Finally let cool to 30° C. and add 90 g of butyl diglycol, then dilute the mixture with 600 ml of water to obtain 1200 g of solution containing approx. 10% of active material and with pH 8.

| | |
|---|---|
| Surface tension at 0.1%: | 21 dynes/cm |
| Surface tension at 0.01%: | 35 dynes/cm |
| Interfacial tension at 0.1%: | 6.5 dynes/cm |
| Alcophobic value: | 18 seconds |

EXAMPLE 10

Preparation of a polymer made up of the following structural units:

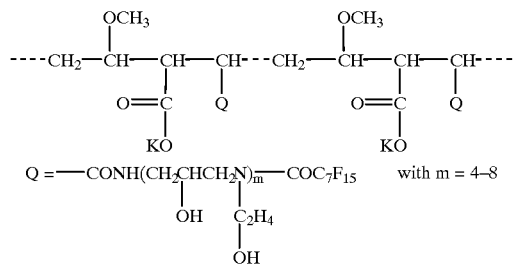

and —COOK —CONH$_2$.

In a reactor with a stirrer and a coolant, weigh 18.3 g (0.30 mole) of monoethanolamine and slowly add 41.5 g (0.1 mole) of perfluorooctanoic acid fluoride diluted in 20 g of dimethylformamide and maintained at 50° C. After this operation, mix for 1 hour more at 50° C. and for 3 hours at 80° C. Then pour in 92.4 ml of water and let the mixture cool to 50° C. Then slowly add 27.8 9 (0.3 mole) of epichlorohydrin while maintaining the temperature of the mixture at 60–70 20 C. Then heat for 10 hours at 80° C.

Then pour in 60 g of solution containing 30 g of technical caustic potash dissolved in 30 ml of water and continue mixing at 80–90° C. for 15 hours.

This yields approx. 260 g of product, which then undergoes the finishing process described in example 5. This yields 1200 g of solution containing approx. 10% of active material, water-soluble with pH approx. 8.5.

| | |
|---|---|
| Surface tension at 0.10%: | 20 dynes/cm |
| Surface tension at 0.010%: | 35 dynes/cm |
| Interfacial tension at 0.10%: | 6 dynes/cm |
| Alcophobic value: | 27 seconds |

EXAMPLE 11

Preparation of a polymer made up of the following structural units:

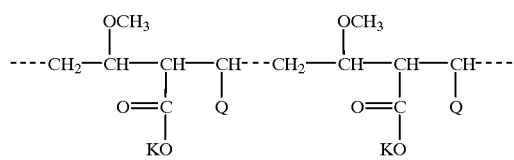

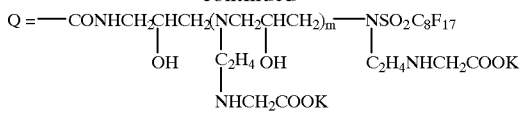

and

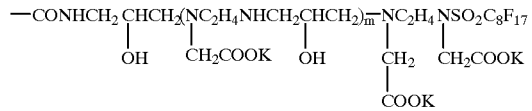

—COOK and —CONH$_2$ with m=0–2

The product is obtained as in example 5, but before adding 600 ml of water, add 23.2 g (0.20 mole) of sodium monochloroacetate dissolved in 300 ml of water. Heat the mixture to 70–80° C. and stir for 7 hours. Complete the mixture to 1200 g with water. It has a pH of 7 and approx. 10% of active material.

| | |
|---|---|
| Surface tension at 0.1%: | 18 dynes/cm |
| Surface tension at 0.01%: | 30 dynes/cm |
| Interfacial tension at 0.1%: | 5 dynes/cm |
| Alcophobic value: | 35 seconds |

EXAMPLE 12

Preparation of a polymer made up of the following structural units:

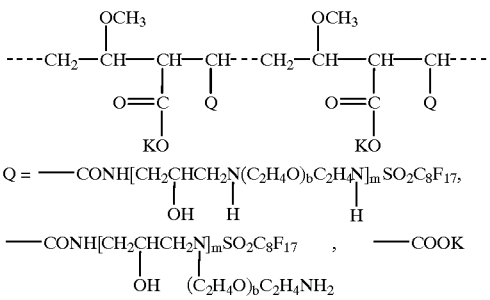

and —CONH$_2$ with b=8 et m=1 á2

Intermediate (a)

In a reactor with a mixer and a coolant, insert 120 g (0.30 mole) of polyether diamine 400, with the following formula:

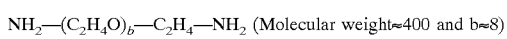

$NH_2-(C_2H_4O)_b-C_2H_4-NH_2$ (Molecular weight≈400 and b≈8)

Then add 50 g (0.10 mole) of perfluorooctylsulfonyl fluoride drop by drop while mixing and cooling. This operation takes approx. 90 minutes maintaining the mixture at 20–30° C. Continue mixing for another 3 hours at 30–40° C. and add 102.2 ml of water.

Then slowly pour in 27.8 g (0.30 mole) of epichlorohydrin, while mixing and cooling. This operation takes approx. 30 minutes, maintaining the mixture at 35–40° C. Stir the mixture for another 3 hours at 35–40° C. and add 240 ml of water.

Pour into this mixture 60 g of concentrated caustic potash (30 g of technical KOH in 30 ml of water) and heat to 80–90° C. Stir the mixture for approx. 10 hours at 90° C. to obtain 600 g of the mixture.

Finishing:

Pour into the previous mixture 250 g of polyamide solution prepared as in example 3 (intermediate (a)) containing 0.32 mole per polymer unit. Stir the mixture for 15 hours at 90° C. Let cool and pour in 90 g of butyldiglycol and 1061 ml of water to obtain 2000 g of product containing approx. 10% of active material, perfectly water-soluble and with a pH of 8.5.

| | |
|---|---|
| Surface tension at 0.1%: | 20 dynes/cm |
| Surface tension at 0.01%: | 32 dynes/cm |
| Interfacial tension at 0.1%: | 4 dynes/cm |
| Alcophobic value: | 28 seconds |

EXAMPLES 13 to 19

Preparation of alcophobic perfluoroalkyl epoxide intermediates, according to the following general and derived formulas:

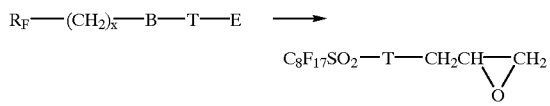

$R_F$=perfluoroalkyl $C_{4-20}$;

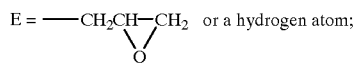  or a hydrogen atom;

$B$=—$SO_2$, —CO when x=0 to 4; or a simple bond when x=1 to 4;

x=an integer from 0 to 4, different from or equal to q

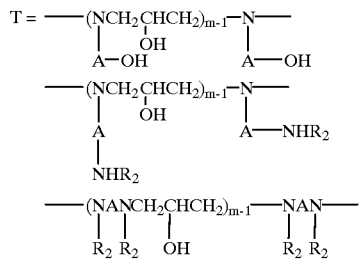

when $E$ = —$CH_2CH$—$CH_2$
          \O/

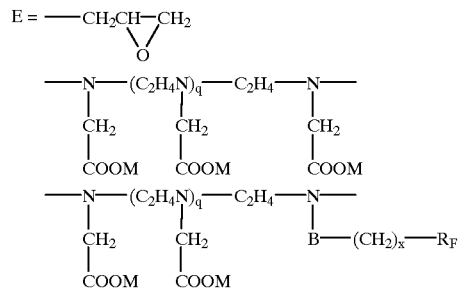

when E=a hydrogen atom
$R_2$=—$CH_2COOM$, —H alkyl $C_{1-4}$
$M$=—H or an alkaline metal or $NH_4^+$ A=alkylene $C_{2-6}$ or another divalent group, such as

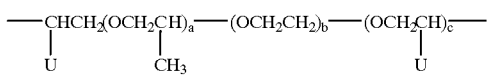

—$(CH_2CH_2NH)_q$—$CH_2CH_2$— when A is between two nitrogen atoms
U=—H or —CH3.
a=an integer from 0 to 60;
b=an integer from 0 to 60, different from or equal to a and c;
c=an integer from 0 to 60, different from or equal to a and b;
m=an integer from 1 to 20
q=an integer from 0 to 4

EXAMPLES 13,14

In a reactor with a mixer and coolant, insert:
either 3.66 g (0.06 mole) of ethanolamine (example 13), or 3.60 g (0.06 mole) of ethylenediamine (example 14).
Then add 4 g of dimethylformamide, then 10 g (0.02 mole) of perfluorooctylsulfonyl fluoride, drop by drop while cooling. This operation takes approx. 90 minutes, maintaining the mixture between 20 and 30° C., then continue mixing for another 3 hours at 30–40° C.

First pour in 5 ml of water, then slowly, while mixing and cooling, 5.5 g (0.06 mole) of epichlorohydrin. After this operation, mix for approx. 30 minutes at 60° C. Then add 5 ml of water and a concentrated caustic potash solution (5 g of KOH dissolved in 5 ml of water). Maintain the mixture at 80° overnight.

For example 13, add 41.84 ml of water and 5 g of butyldiglycol to obtain 85 g of concentrated solution.

As in example 14, add 7 g (0.06 mole) of sodium monochloroacetate dissolved in 30 ml of water and mix for approx. 10 hours at 70–80° C. After having cooled the mixture, add 2.3 g of caustic potash solution dissolved in 12.6 ml of water to obtain a pH approx. 9. Then pour in 5 g of butyldiglycol to obtain 100 g of concentrated product.

EXAMPLES 15,16,17,18,19

In a reactor with a mixer and a coolant, insert:
either 13.80 g (0.06 mole) of poly(oxypropylene) diamine, with the following formula:

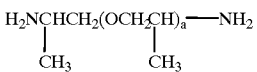

(molecular weight≈230; a=2 to 3; mean value=2.6) (example 15)

or 120 g (0.06 mole) of poly(oxyethylene)diamine, with the following formula:

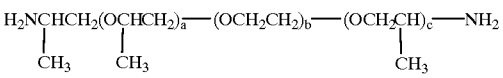

(molecular weight≈2000; b=40.5; a+c=2.5) (example 16)
or 6.18 g (0.06 mole) of diethylenetriamine (mixture of isomers) (ex. 17),
or 11.45 g (0.06 mole) of tetraethylenepentamine (mixture of isomers) (ex.18)

or 13.92 g (0.06 mole) of pentaethylenehexamine (mixture of isomers) (ex.19)

Then add 4 g of dimethylformamide (except for example 16 where 40 g of DMF are used) and 7.35 g (0.06 mole) of ethyl monochloroacetate while cooling and maintaining the maximum temperature at approx. 60–70° C. for one hour.

Cool the mixture to 40° C. to add 10 g of triethylamine and pour slowly 10 g (0.02 mole) of perfluorooctylsulfonyl fluoride while maintaining the temperature at 70° C. for 2 hours and at 85° C. during 2 more hours.

Then add 20 ml of water. Cool to 50° C. and slowly pour in, while mixing and cooling, 5.5 g (0.06 mole) of epichlorhydrin. The mixture should be mixed for half an hour at 70° C.

Then pour in 5 ml of water and a concentrated caustic potash solution (5 g of KOH dissolved in 5 ml of water). Mix overnight at 80° C.

Cool to 30° C. and add 4 g of butyl diglycol and complete the mixture to 100 g with water (except in example 16 where the mixture is completed to 270 g with water) to obtain a concentrated solution.

The following table presents the values of surface and interfacial tension, as well as the alcophobic values for the aqueous solutions of the products obtained in examples 13 to 19:

| Example | 13 | 14 | 15 | 16 | 17 | 18 | 19 |
|---|---|---|---|---|---|---|---|
| Product obtained/g | 85 | 100 | 100 | 270 | 100 | 100 | 100 |
| Active material/% | 19 | 22 | 29 | 51 | 23 | 28 | 30 |
| Surface tension of a solution at 0.1% (dynes/cm) | 17.0 | 18.7 | 22.4 | 22.4 | 21.6 | 22.0 | 25.5 |
| 0.01% (dynes/cm) | 17.3 | 31.1 | 24.1 | 40.1 | 26.4 | 23.4 | 29.3 |
| Interfacial tension of a solution at 0.1% (dynes/cm) | 5.3 | 3.8 | 4.3 | 7.2 | 4.2 | 3.8 | 5.1 |
| Alcophobic value of a 5% solution (seconds) | 45 | 50 | 30 | 5 | 25 | 30 | 28 |

EXAMPLES 20, 21, 22

Preparation of a polymer made up of the following structural units:

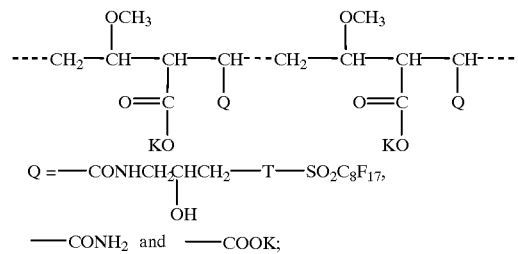

$Q = $ —CONHCH$_2$CHCH$_2$—T—SO$_2$C$_8$F$_{17}$,
             |
             OH

—CONH$_2$ and —COOK;

T is defined in examples 13 to 19.

In a reactor, insert 25 g of polyamide obtained in example 3 (a) and add 50 g of the product prepared as in example 16 or 17 or 18. Then mix and heat for 15 hours at 90° C. Then add 40 ml of water and 5 g of butyldiglycol, to obtain 120 g of a concentrated solution, with a thick consistency, perfectly water-soluble, with pH approx. 9. The following table shows the values of surface and interfacial tension as well as the alcophobic value for an aqueous solution of the products obtained in example 20, 21 22.

| Example | 20 | 21 | 22 |
|---|---|---|---|
| Product obtained/g | 120 | 120 | 120 |
| Active material/% | 16 | 13 | 15 |
| Surface tension of a solution at | | | |
| 0.1% (dynes/cm) | 24 | 22.6 | 26 |
| 0.01% (dynes/cm) | 35 | 38 | 36 |
| Interfacial tension of a solution at 0.1% (dynes/cm) | 5.6 | 4.5 | 4.8 |
| Alcophobic value of a 5% solution (seconds) | 30 | 40 | 38 |

EXAMPLE 23

Preparation of a n alcophobic perfluoroalkyl intermediate with one mobile hydrogen according to the following general and derived formulas:

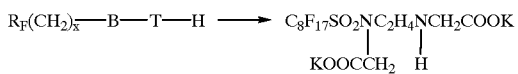

$R_F$, B, T and X are defined in examples 13 to 19.

In a reactor with a mixer and a coolant, insert 1.2 g (0.02 mole) of ethylenediamine and 6 g of dimethylformamide.

Then add 10 g (0.02 mole) of perfluorooctylsulfonyl fluoride drop by drop and while cooling. Maintain the temperature at a maximum of 30° C. during this operation and mix for another 2 hours at 30–40° C. Add 4.7 g (0.04 mole) of sodium monochloroacetate in 10 ml of water, maintaining the mixture at approx. 40–50° C. for one hour. Then pour in 20 ml of a caustic potash solution containing 3.4 g of KOH in 5 ml of water and mix for 4 hours at 60–70° C. Cool and add 5 g of butyldiglycol and complete the mixture to 100 g by adding water to obtain a concentrated solution with pH approx. 8–9.

The following table shows the values of surface and interfacial tension as well as the alcophobic value for an aqueous solution of the products obtained in example 23.

| Example | 23 |
|---|---|
| Product obtained/g | 100 |
| Active material/% | 14 |
| Surface tension of a solution at | |
| 0.1% (dynes/cm) | 18 |
| 0.01% (dynes/cm) | 25 |
| Interfacial tension of a solution at 0.1% (dynes/cm) | 6 |
| Alcophobic value of a 5% solution (seconds) | 20 |

EXAMPLES 24, 25

Preparation of an alcophobic perfluoroalkyl intermediate with one mobile hydrogen according to the following general and derived formulas:

$R_F(CH_2)_x$—B—T—H ⟶

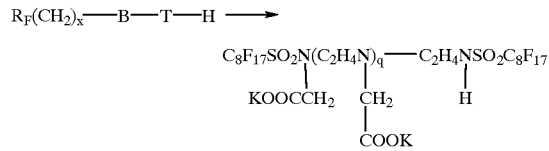

q=1 in example 24
q=/1 in example 25

$R_F$, B, T and x are defined in examples 13 to 19.

In a reactor with a mixer and a coolant, insert:

either 1.03 g (0.01 mole) of diethylenetriamine (mixture of isomers) (example 24), or 1.89 9 (0.01 mole) of tetraethylenepentamine (mixture of isomers) (example 25)

and 4 g of dimethylformamide.

Then, pour in 10 g (0.02 mole) of perfluorooctylsulfonyl fluoride while cooling and mixing energetically. Mix for one half hour at 50° C. and two more hours at 80° C. Then add 5 ml of water while cooling to 50° C. and pour in a solution containing 2.33 g (0.02 mole) for example 24, or 4.66 g (0.04 mole) for example 25 of sodium monochloroacetate dissolved in 10 ml or 20 ml of water, respectively. Maintain the mixture at 70–80° C. for 5 hours. Then cool the mixture to 30° C. and add 4 g of butyidiglycol, then 5.6 g (example 24) or 7.9 g (example 25) of a 50% concentration of caustic potash, and the amount of water needed to obtain 100 g of concentrated solution with pH approx. 8.

The following table shows the values of surface and interfacial tension as well as the alcophobic value for an aqueous solution of the products obtained in examples 24 and 25

| Example | 24 | 25 |
|---|---|---|
| Product obtained/g | 100 | 100 |
| Active material/% | 12.5 | 15 |
| Surface tension of a solution at | | |
| 0.1% (dynes/cm) | 17.5 | 16.5 |
| 0.01% (dynes/cm) | 19 | 18.5 |
| Interfacial tension of a solution at 0.1% (dynes/cm) | 4.5 | 4.8 |
| Alcophobic value of a 5% solution (seconds) | 40 | 50 |

EXAMPLES 26, 27, 28

Preparation of a polymer made up of the following structural units:

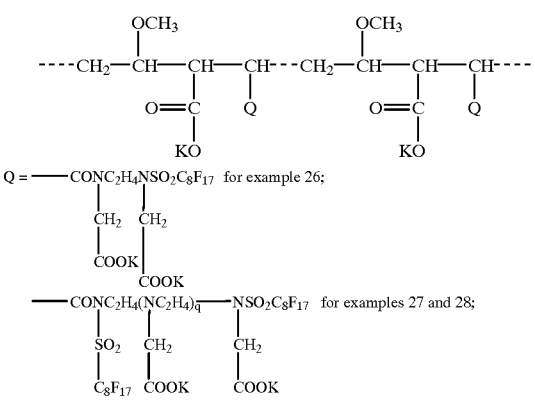

where q=1 for example 27
where q=3 for example 28
—COOK

In a spherical glass container with a stirrer and a coolant, pour in 77.4 ml of water, in which 15.6 g (0.1 mole per polymer unit) of methylic vinyl ether and maleic anhydride copolymer are dispersed at room temperature (molecular weight=25000). Then add 100 g of the product obtained (previously checked and adjusted to pH 9 by adding concentrated caustic potash if needed)

either as in example 23 (for example 26), or as in example 24 (for example 27), or as in example 25 (for example 28), Mix and heat to 80° C. for 10 hours. Let cool to 30° C., then add 17 g of a 50% solution of caustic potash and complete with water to obtain approx. 200 g of concentrated product in paste form with pH approx. 8.

The following table shows the values of surface and interfacial tension as well as the alcophobic value for an aqueous solution of the products obtained in examples 26 to 28:

| Example | 26 | 27 | 28 |
|---|---|---|---|
| Product obtained/g | 200 | 200 | 200 |
| Active material/% | 14 | 14 | 15 |
| Surface tension of a solution at | | | |
| 0.1% (dynes/cm) | 19 | 20 | 18.5 |
| 0.01% (dynes/cm) | 21 | 23 | 22 |
| Interfacial tension of a solution at 0.1% (dynes/cm) | 5 | 4.5 | 5.5 |
| Alcophobic value of a 5% solution (seconds) | 30 | 50 | 60 |

EXAMPLES 29, 30

Preparation of alcophobic perfluoroalkyl intermediates with one mobile hydrogen according to the following general and derived formulas:

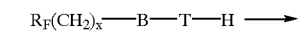

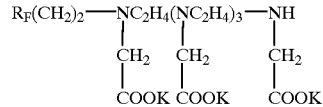

B, T, and x are defined in examples 13 to 19.
$R_F =$ —$C_6F_{13}$ for example 29
—$C_8F_{17}$ for example 30

In a spherical glass container with a coolant and a stirrer, place 11.45 g (0.06 mole) of tetraethylenepentamine (mixtures of isomers) and add either 9.2 g (0.02 mole) of perfluorohexylethyl iodide (example 29), or 11.2 g (0.02 mole) of perfluorooctylethyl iodide (example 30);

then heat to 30° C. and, while mixing, add 5 g of dimethylformamide and maintain the mixture at 90° C. for 5 hours.

Cool the mixture to 50° C. then add 39.6 g (0.34 mole) of sodium monochloroacetate dissolved in 70 ml of water and mix for 5 hours at 70° C. Then pour in a caustic potash solution containing 17 g of KOH and 20 ml of water. Maintain the temperature at 70° C. for 2 more hours, add 6 g of butyl diglycol and complete with water to obtain 200 g of concentrated product.

The following table shows the values of surface and interfacial tension as well as the alcophobic value for an aqueous solution of the products obtained in examples 29 and 30:

| Example | 29 | 30 |
|---|---|---|
| Product obtained/g | 200 | 200 |
| Active material/% | | |
| Surface tension of a solution at | | |
| 0.1% (dynes/cm) | 23 | 22 |
| 0.01% (dynes/cm) | 34 | 32 |
| Interfacial tension of a solution at 0.1% (dynes/cm) | 5 | 5.5 |
| Alcophobic value of a 5% solution (seconds) | 15 | 20 |

EXAMPLE 31

Preparation of an alcophobic perfluoroalkyl intermediate with one mobile hydrogen according to the following general and derived formulas:

$R_F(CH_2)_x$—B—T—H ⟶

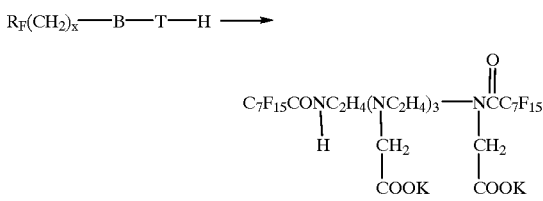

$R_F$, B, T and x are defined in examples 13 to 19.

In a reactor, weigh 1.89 g (0.1 mole) of tetraethylenepentamine (mixture of isomers) and 5 g of dimethylformamide; then add in several portions 8.65 g (0.02 mole) of perfluorooctanoyl chloride. Maintain the mixture at 50° C. for one half hour and at 80° C. for 3 hours. Cool the mixture to 50° C. and add 4.7 g (0.04 mole) of sodium monochloroacetate dissolved in 10 ml water. Then mix at 70° C. for 7 hours. Pour in 30 ml of water and cool the mixture to 30° C. Then add 2.3 g of caustic potash dissolved in 5 g of water and 4 g of butyldiglycol. Complete the mixture to 80 g with water.

The following table shows the values of surface and interfacial tension as well as the alcophobic value for an aqueous solution of the products obtained in example 31:

| Example | 31 |
|---|---|
| Product obtained/g | 80 |
| Active material/% | 17 |
| Surface tension of a solution at | |
| 0.1% (dynes/cm) | 18 |
| 0.01% (dynes/cm) | 25 |
| Interfacial tension of a solution at 0.1% (dynes/cm) | 5 |
| Alcophobic value of a 5% solution (seconds) | 45 |

EXAMPLE 32, 33

Preparation of polymers made up of the following structural units:

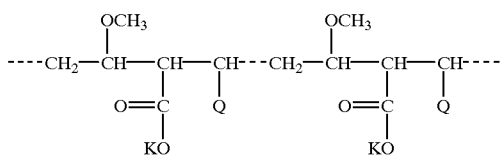

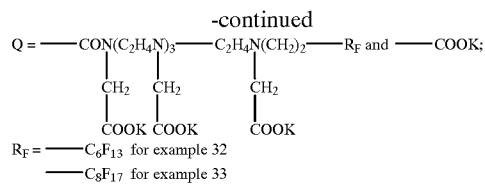

$R_F =$ —$C_6F_{13}$ for example 32
—$C_8F_{17}$ for example 33

In a spherical glass container with a stirrer and a coolant, weigh 200 g of the product obtained:
either as in example 29,
or as in example 30.

Check and adjust pH to 9 by adding concentrated caustic potash if needed. Then incorporate 15.6 g of methyl vinyl ether and maleic anhydride copolymer stirring well. After dispersion, heat the mixture at 80° C. for 10 hours. Let the mixture cool to 30° C. and add a concentrated caustic potash solution and complete with water to obtain 235 g of finished product with the consistency of a paste and pH approx. 8.

The following table shows the values of surface and interfacial tension as well as the alcophobic value for an aqueous solution of the products obtained in examples 32 and 33:

| Example | 32 | 33 |
|---|---|---|
| Product obtained/g | 235 | 235 |
| Active material/% | 15 | 16 |
| Surface tension of a solution at | | |
| 0.1% (dynes/cm) | 24 | 23 |
| 0.01% (dynes/cm) | 36 | 35 |
| Interfacial tension of a solution at 0.1% (dynes/cm) | 4.5 | 5 |
| Alcophobic value of a 5% solution (seconds) | 35 | 40 |

EXAMPLE 34

Preparation of a polymer made up of the following structural units:

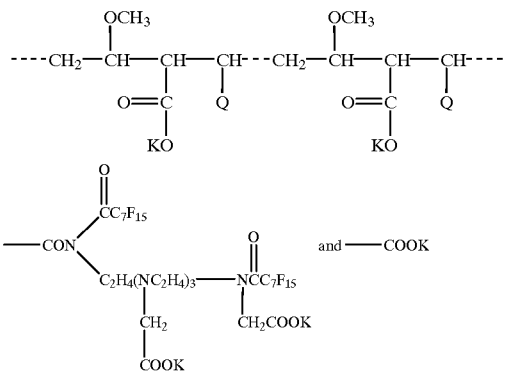

In a spherical glass container with a coolant and a stirrer, pour in 80 ml of water, in which 15.6 g (0.1 mole per polymer unit) of methyl vinyl ether and maleic anhydride copolymer is dispersed, at room temperature. Then add 80 g of the product obtained as in example 31, after checking and adjusting to pH 9 by adding concentrated caustic potash if needed. Mix the two ingredients and heat at 80° C. for 10 hours. Let cool the mixture to 30° C. and add a 40% solution of caustic potash and complete with water to obtain 200 g of concentrated product to pH approx. 8; it should have the consistency of a paste.

The following table shows the values of surface and interfacial tension as well as the alcophobic value for an aqueous solution of the products obtained in example 34:

| Example | 34 |
|---|---|
| Product obtained/g | 200 |
| Active material/% | 14 |
| Surface tension of a solution at | |
| 0.1% (dynes/cm) | 22 |
| 0.01% (dynes/cm) | 30 |
| Interfacial tension of a solution at 0.1% (dynes/cm) | 5.5 |
| Alcophobic value of a 5% solution (seconds) | 55 |

EXAMPLE 35

This example serves to define the modus operandi for measuring the alcophobic value, that is the resistance to the destructive force of polar liquids, ethanol in this case.

(a) Prepare solutions made up of 95 parts of water by weight and 5 parts of test product by weight.

(b) In a stainless steel cylinder (Ø: 70 mm, height: 32.5 mm, capacity: 125 ml), pour 100 ml of 95% ethanol at 20–22° C. for the liquid and the ambient air. Cover 90% of the surface of the ethanol with 25 ml of foam produced with solution (a) using a clearly defined method. From the time the foam is poured onto the surface, record the amount of time necessary to destroy half of the foam initially poured on. The time in seconds corresponds to the relative alcophobic value.

The fluorinated surfactants known until now resist for only 1 to 2 seconds when in contact with polar liquids; they disappear virtually instantly on the surface of the alcohol.

Products resisting for more than 10 seconds can be used for multipurpose emulsifying compounds, i.e., they reinforce the resistance of the extinguishing foam to destructive fires caused by polar liquids.

The following table shows the results of the alcophobic trials on the products obtained in examples 1 to 34 and compared to the relative alcophobic value of a commercially available fluorinated surfactant:

| 5% solution prepared with the product in example: | Active material (%) | Relative alcophobic value (seconds) | 5% solution prepared with the product in example: | Active material (%) | Relative alcophobic value (seconds) |
|---|---|---|---|---|---|
| 1 | 1.25 | 10 | commercially available fluorinated surfactant | 1.35 | <2 |
| 2 | 2.00 | 15 | 18 | 0.75 | 30 |
| 3 | 0.50 | 30 | 19 | 0.80 | 28 |
| 4 | 0.50 | 20 | 20 | 0.80 | 30 |
| 5 | 0.50 | 32 | 21 | 0.65 | 40 |
| 6 | 0.50 | 25 | 22 | 0.75 | 38 |
| 7 | 1.50 | 12 | 23 | 0.70 | 20 |
| 8 | 0.85 | 37 | 24 | 0.62 | 40 |
| 9 | 0.50 | 18 | 25 | 0.75 | 50 |
| 10 | 0.50 | 27 | 26 | 0.70 | 30 |
| 11 | 0.50 | 35 | 27 | 0.70 | 50 |
| 12 | 0.50 | 28 | 28 | 0.75 | 60 |
| 13 | 0.95 | 45 | 29 | 0.50 | 15 |
| 14 | 1.10 | 50 | 30 | 0.55 | 20 |
| 15 | 1.45 | 30 | 31 | 0.85 | 45 |
| 16 | 2.55 | 5 | 32 | 0.75 | 35 |
| 17 | 0.70 | 25 | 33 | 0.80 | 40 |
|   |   |   | 34 | 0.70 | 55 |

What is claimed is:

1. Water-soluble polyperfluoroalkyl surfactant corresponding to the following general formula:

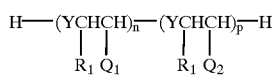

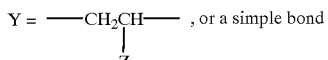

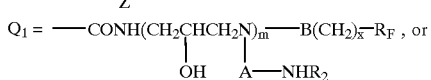

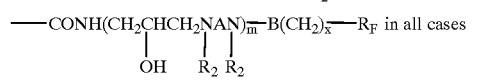

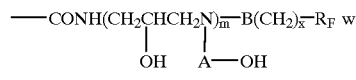

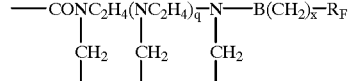

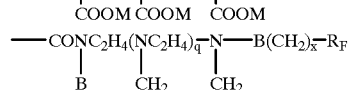

$Q_2$=—$CONH_2$ in all cases and a combination of —COOM, —COOWOR$_3$,

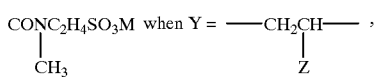

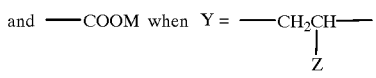

$R_F$=perfluoroalkyl $C_{4-20}$;

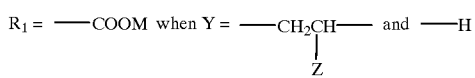

when Y is a simple bond;

A=alkylene $C_{2-6}$ or

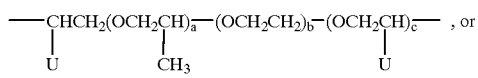, or

—$(CH_2CH_2NH)_q$—$CH_2CH_2$— when A is between two nitrogen atoms;

$R_2$=—$CH_2COOM$, —H, alkyl $C_{1-4}$;
$R_3$=phenyl, alkylphenyl, alkyl;
a=an integer from 0 to 60
b=an integer from 0 to 60, different from or equal to a and c
c=an integer from 0 to 60, different from or equal to a and b
n=an integer greater than 10
m=an integer from 1 to 20,
l=an integer from 0 to 20, different from or equal to m
p=an integer different from or equal to n and greater than 10
q=an integer from o to 4
x=an integer from 0 to 4, different from or equal to q B=—$SO_2$, —CO when x=0 to 4; or a simple bond when x=1 to 4
w=—$(CH_2CH_2O)_l$—$CH_2CH_2$—
Z=phenyl, $OCH_3$, —H, —$CH_3$, $C_2H_5$, —$CONH_2$, —$COOCH_3$ —$COOCH_3$, —$CH_2OOCCH_3$, —N-pyrrolidone;
U=—H or —$CH_3$
M=—H or an alkaline metal or $NH^+_4$.

2. Polyperfluoroalkyl surfactant according to claim 1 in which said surfactant is produced from an ethylenic and maleic anhydride polymer.

3. Polyperfluoroalkyl surfactant according to claim 1 in which said surfactants is produced from a polyacrylic polymer.

4. Polyperfluoroalkyl surfactant, according to claim 1, wherein said surfactant is both alcorhobic and oleophobic and said surfactant is a component of a fire extinguishing foam for extinguishing fires fueled by hydrocarbons or fires fueled by polar liquids selected from the group consisting of alcohols, ethers and esters.

* * * * *